United States Patent
Chen et al.

(10) Patent No.: US 12,328,161 B2
(45) Date of Patent: Jun. 10, 2025

(54) METHODS AND DEVICES FOR FEEDING BACK AND CONFIGURING PILOT PARAMETERS, USER TERMINAL AND BASE STATION

(71) Applicant: ZTE CORPORATION, Guangdong (CN)

(72) Inventors: Yijian Chen, Shenzhen (CN); Zhaohua Lu, Shenzhen (CN); Yu Ngok Li, Shenzhen (CN); Chuangxin Jiang, Shenzhen (CN); Bo Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/054,876

(22) Filed: Nov. 11, 2022

(65) Prior Publication Data

US 2023/0077065 A1    Mar. 9, 2023

Related U.S. Application Data (63) Continuation of application No. 16/346,481, filed as application No. PCT/CN2017/108996 on Nov. 1, 2017, now abandoned.

(30) Foreign Application Priority Data

Nov. 4, 2016 (CN) .......................... 201610963386.5

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0619* (2013.01); *H04B 17/24* (2015.01); *H04L 5/0048* (2013.01)

(58) Field of Classification Search
CPC .................................................... H04B 7/0417
(Continued)

(56) References Cited

U.S. PATENT DOCUMENTS

2007/0286310 A1    12/2007   Fukuoka et al.
2010/0238824 A1*    9/2010   Farajidana ........... H04B 7/0417
                                                                370/278
(Continued)

FOREIGN PATENT DOCUMENTS

CN         104811275 A     7/2015
CN         105323747 A     2/2016
(Continued)

OTHER PUBLICATIONS

Zte, et al., Enhancements for DMRS-based Semi-Open-Loop Transmission. 3GPP TSG RAN WG1 Meeting #86bisR1-1608686, Oct. 14, 2016.

(Continued)

*Primary Examiner* — Lihong Yu
(74) *Attorney, Agent, or Firm* — Knobbe, Martens, Olson & Bear, LLP (57) ABSTRACT

Provided are a method and device for feeding back a reference signal parameter, a user terminal and a base station. The method for feeding back a reference signal parameter includes: determining, by a terminal, at least one of a transmission parameter or a reception parameter of a reference signal; and feeding back, by the terminal, the at least one of the transmission parameter or the reception parameter of the reference signal to a base station.

15 Claims, 4 Drawing Sheets (51) Int. Cl.
   *H04B 17/24*   (2015.01)
   *H04L 5/00*    (2006.01)
(58) Field of Classification Search
   USPC .......................................................... 375/262
   See application file for complete search history.

(56) References Cited

U.S. PATENT DOCUMENTS

| | | | |
|---|---|---|---|
| 2012/0106388 A1* | 5/2012 | Shimezawa | H04L 25/0232 370/252 |
| 2012/0281647 A1* | 11/2012 | Kuo | H04L 1/1812 370/328 |
| 2012/0300728 A1* | 11/2012 | Lee | H04L 5/0026 370/329 |
| 2013/0039284 A1* | 2/2013 | Marinier | H04L 5/001 370/329 |
| 2013/0272220 A1* | 10/2013 | Li | H04W 74/006 370/329 |
| 2013/0301450 A1* | 11/2013 | Geirhofer | H04B 7/024 370/252 |
| 2014/0226636 A1 | 8/2014 | Xu et al. | |
| 2015/0043475 A1* | 2/2015 | Kim | H04W 72/23 370/329 |
| 2015/0098347 A1 | 4/2015 | Guo et al. | |
| 2015/0131750 A1 | 5/2015 | Xue et al. | |
| 2015/0282001 A1* | 10/2015 | Kwak | H04B 7/0695 370/229 |
| 2015/0372766 A1* | 12/2015 | Yoshida | H04B 10/61 398/208 |
| 2016/0029371 A1* | 1/2016 | Yang | H04W 72/1268 370/329 |
| 2016/0191128 A1 | 6/2016 | Jiang et al. | |
| 2016/0302167 A1* | 10/2016 | Yi | H04W 56/0015 |
| 2016/0345216 A1 | 11/2016 | Kishiyama et al. | |
| 2017/0156108 A1* | 6/2017 | Kim | H04W 36/0088 |
| 2017/0164250 A1 | 6/2017 | Kim et al. | |
| 2017/0317731 A1 | 11/2017 | Chen et al. | |
| 2018/0013477 A1 | 1/2018 | Kim et al. | |

FOREIGN PATENT DOCUMENTS

| | | |
|---|---|---|
| CN | 105450272 A | 3/2016 |
| CN | 105515725 A | 4/2016 |
| CN | 105991264 A | 10/2016 |
| CN | 106034006 A | 10/2016 |

OTHER PUBLICATIONS

International Search Report dated Jan. 26, 2018 for International Application No. PCT/CN2017/108996, 5 pages.
Written Opinion of the International Searching Authority dated Jan. 26, 2018 for International Application No. PCT/CN2017/108996, 3 pages.
First Search Report for CN 201610963386.5 issued May 27, 2021.
First Office Action for CN 201610963386.5 issued Jun. 3, 2021.

* cited by examiner

METHODS AND DEVICES FOR FEEDING BACK AND CONFIGURING PILOT PARAMETERS, USER TERMINAL AND BASE STATION

CROSS-REFERENCE TO RELATED APPLICATIONS

The present application is a continuation of U.S. Non-Provisional application Ser. No. 16/346,481 titled "Methods and Devices For Feeding Back and Configuring Pilot Parameters, User Terminal and Base Station" and filed on Apr. 30, 2019, which is a National Stage Application, filed under 35 U.S.C. 371, of International Patent Application No. PCT/CN2017/108996, filed on Nov. 1, 2017, which claims priority to Chinese patent Application No. 201610963386.5 filed on Nov. 4, 2016, the contents of which are incorporated herein by reference in their entireties as though fully and completely set forth herein.

TECHNICAL FIELD

The present disclosure relates to, but is not limited to, the field of wireless communications and, in particular, relates to a method and device for feeding back a reference signal parameter, a method and device for configuring a reference signal parameter, a user terminal and a base station.

BACKGROUND

In a wireless communication system, a transmitting end may use multiple antennas to get a higher transmission rate. Multiple antennas can bring improvement of the signal-to-noise ratio and support more spatial multiplexing layers. The multi-input multi-output (MIMO) technology with the channel state information (CSI) indication information (closed-loop MIMO precoding) used by the transmitting end provides a higher capacity and is a transmission technology used by the current mainstream 4G standard.

In the closed-loop MIMO precoding technology, a receiving end feeds back channel information to the transmitting end. The transmitting end uses the transmit precoding technology according to the obtained channel information to obtain the beamforming gain and the spatial multiplexing gain, thereby greatly improving the transmission performance. For single-user MIMO, the transmitting end uses the precoding vector matched with channel feature vector information to send the precoding. For multi-user MIMO, the transmitting end performs efficient forming and interference cancellation according to the channel information.

In an actual use of the MIMO technology, the involved reference signal includes: a measurement reference signal, a demodulation reference signal and a phase noise compensation reference signal.

1) The measurement reference signal is mainly used for measurement and feedback of the receiving end.

The following types of measurement reference signals are defined in 4G LTE-advanced:

downlink channel state information reference signal (CSI-RS); and uplink sounding reference signal (SRS).

The two types of reference signals are respectively used for downlink and uplink channel information CSI measurement and may be transmitted in a periodic or aperiodic mode. For specific configuration and usage, reference may be made to 3GPP technical specifications, TS 36.211 and TS36.213. Measurement reference signals for multiple ports are supported in both the downlink and the uplink.

Due to the introduction of more antennas and more service beams in 5G, these reference signals may have some new designs, for example, may be transmitted in the manner of beam scanning, and the transmitting configuration will be more diverse.

In addition, other types of measurement reference signals further exist due to other measurement requirements, such as measurement of the receive signal quality of some cells or sectors related to mobility management, measurement of large scale properties, etc. These reference signals are also a type of measurement reference signal. The above measurement functions may be implemented through the CSI-RS or the SRS. Some other reference signals, such as a beam reference signal (BRS) or other measurement reference signals with other names may also be additionally transmitted.

2) The demodulation reference signal includes a data demodulation reference signal and a control demodulation reference signal.

When the channel information is obtained, the transmitting end may perform pre-coded data or control transmission according to the channel information, and may use one or more layers of multi-antenna transmission technology. Generally, each layer has a corresponding demodulation reference signal (DMRS), and the data or control information is demodulated by using the channel estimated by the demodulation reference signal and combining the received signal. The demodulation reference signal is divided into an uplink demodulation reference signal (UL DMRS) and a downlink demodulation reference signal (DL DMRS) respectively for demodulation of downlink control or data, and demodulation of uplink control or data.

3) The type of phase noise compensation reference signal (PNCRS) is generally used for phase compensation when the phase noise is relatively large, may also be used for frequency offset tracking, and therefore may also be considered as a frequency offset estimation reference signal.

The type of reference signal may appear alone or as part of the DMRS. When used for data demodulation, the type of reference signal may also be understood as a special demodulation reference signal. If the type of reference signal is defined on the transmission layer and each layer corresponds to a port of a phase noise supplemental reference signal, the type of reference signal may be considered as part of the DMRS.

SUMMARY

A summary of the subject matter is described hereinafter in detail. This summary is not intended to limit the scope of the claims.

A method and device for feeding back a reference signal parameter, a method and device for configuring a reference signal parameter, a user terminal and a base station are provided in the embodiments of the present disclosure.

The embodiments are as follows.

The method for feeding back a reference signal parameter includes steps described below.

A terminal determines at least one of a transmission parameter or a reception parameter of a reference signal.

The terminal feeds back the at least one of the transmission parameter or the reception parameter of the reference signal to a base station.

The method for configuring a reference signal parameter includes steps described below.

A network side determines at least one of a transmission parameter or a reception parameter of a reference signal.

The network side configures the at least one of the transmission parameter or the reception parameter of the reference signal for a terminal through downlink signaling.

The device for feeding back a reference signal parameter includes: a determining unit and a transmitting unit.

The determining unit is configured to determine at least one of a transmission parameter or a reception parameter of a reference signal.

The transmitting unit is configured to feed back the at least one of the transmission parameter or the reception parameter of the reference signal to a base station. A type of the reference signal is at least one of: a demodulation reference signal, a measurement reference signal or a phase noise compensation reference signal.

The device for configuring a reference signal parameter includes: a determining unit and a configuration unit.

The determining unit is configured to determine at least one of a transmission parameter or a reception parameter of a reference signal.

The configuration unit is configured to configure the at least one of the transmission parameter or the reception parameter of the reference signal for a terminal through downlink signaling. A type of the reference signal is at least one of: a demodulation reference signal, a measurement reference signal or a phase noise compensation reference signal.

The user terminal includes a processor and an antenna system.

The processor is configured to determine at least one of a transmission parameter or a reception parameter of a reference signal.

The antenna system is configured to feed back the at least one of the transmission parameter or the reception parameter of the reference signal to a base station.

A type of the reference signal is at least one of: a demodulation reference signal, a measurement reference signal or a phase noise compensation reference signal.

The base station includes a processor and an antenna system.

The processor is configured to determine at least one of a transmission parameter or a reception parameter of a reference signal.

The antenna system is configured to configure the at least one of the transmission parameter or the reception parameter of the reference signal for a terminal through downlink signaling.

In the embodiments of the pretransmitted disclosure, the terminal determines at least one of the transmission parameter or the reception parameter of the reference signal and feeds back the at least one of the transmission parameter or the reception parameter of the reference signal to a base station. The base station can refer to the UE's recommendation for more reasonable reference signal configuration, so that a good compromise between reference signal resource utilization and performance is achieved for different UEs.

DETAILED DESCRIPTION

In condition that the reference signal configuration is determined by a base station and then notified to a terminal and since these reference signals have been designed to take into account the measurement and demodulation requirements of the terminal with the mainstream configuration in the typical scenario, the base station can decide which configuration to use after a simple judgment. Such method may be sufficient in 4G, while differences in the following aspects exist in 5G. The difference between terminals becomes larger, for example, the number of receive antennas of the terminal increases, and the configuration is greatly different; the application scenario of 5G is more complicated, and a wider communication frequency, the moving speed, more types of services need to be considered; the difference between requirements from terminals becomes larger; and the same reference signal may need to implement more functions. Therefore, the configuration of the reference signal in the 5G completely determined by the base station cannot be very accurate; and the configuration of the reference signal completely determined by the base station results in insufficient reference signal configuration flexibility, a good reference signal efficiency cannot be obtained, and a good compromise between reference signal resource utilization and performance cannot be achieved.

Figure 1:
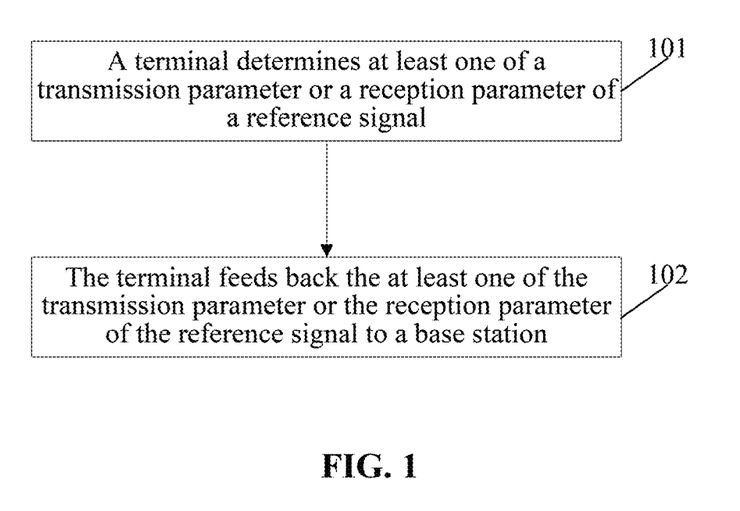
FIG. 1 is a flowchart of a method for feeding back a reference signal parameter according to an embodiment of the present disclosure.

FIG. 1 is a flowchart of a method for feeding back a reference signal parameter according to an embodiment of the present disclosure. As shown in FIG. 1, the method for feeding back a reference signal parameter according to the embodiment of the present disclosure includes steps described below.

In a step 101, at least one of a transmission parameter or a reception parameter of a reference signal is determined by a terminal.

In a step 102, the terminal feeds back the at least one of the transmission parameter or the reception parameter of the reference signal to a base station.

A type of the reference signal includes at least one of: a demodulation reference signal, a measurement reference signal or a phase noise compensation reference signal.

The reception parameter includes one or more of: receive antenna information, receive port information, receive beam information and receive mode information.

When a type of the reference signal is the demodulation reference signal, the transmission parameter includes one or more of: indication information about the number of repeated transmissions of demodulation reference signals having the same precoding; indication information about the number of symbols for transmitting the demodulation reference signal;
- indication information about a time domain density of a resource for transmitting the demodulation reference signal;
- indication information about a frequency domain density of the resource for transmitting the demodulation reference signal;
- indication information about a position of the demodulation reference signal; and
- indication information about a sequence parameter of the demodulation reference signal. Optionally, the sequence parameter includes: a sequence type;
- indication information about a transmission power of the demodulation reference signal; and
- indication information about a precoding binding granularity of the demodulation reference signal.

In condition that the type of the reference signal is the demodulation reference signal, demodulation reference signal resources are grouped, and the terminal feeds back the at least one of the transmission parameter or the reception parameter to each of a plurality of different reference signal resource groups. The resources are at least one of time domain resources, frequency domain resources, port resources, and beam resources.

In condition that a type of the reference signal is a demodulation reference signal, the terminal agrees on with a base station or the base station configures a set having X1 sets of demodulation reference signal parameters, and the terminal selects Y1 sets of demodulation reference signal parameters from the set having X1 sets of demodulation reference signal parameters and feeds back corresponding indication information to the base station. Where Y1 is less than or equal to X1.

When the type of the reference signal is the demodulation reference signal, the terminal feeds back the at least one of the transmission parameter or the reception parameter for each of a plurality of types of control channel configurations.

In condition that the type of the reference signal is the demodulation reference signal, the terminal feeds back the at least one of the transmission parameter or the reception parameter for each of a plurality of different transmission areas. The transmission areas are data transmission areas or control transmission areas.

When the type of the reference signal is a measurement reference signal, the transmission parameter includes at least one of:
- the number of measurement reference signal blocks to be transmitted;
- a rule for transmitting the measurement reference signal blocks;
- the number of time domain symbols included in the measurement reference signal blocks;
- the number of repeated transmissions of the measurement reference signal;
- indication information about precoding corresponding to the measurement reference signal;
- information about an optional precoding set corresponding to the measurement reference signal; or
- a precoding/beam relationship between a plurality of measurement reference signals.

The number of repeated transmissions includes: the number of repeated transmissions of a reference signal corresponding to a same port; or the number of repeated transmissions of reference signals having a same transmission mode; or the number of repeated transmissions of reference signals having a same transmission mode in a same reference signal resource block; or the number of repeated transmissions of reference signal resource blocks having a same transmission mode; or a number of repeated transmissions of a reference signal corresponding to a same beam.

When the type of the reference signal is the measurement reference signal, the terminal feeds back the reference signal parameter for each of P1 types of measurement reference signals. P1 is an integer greater than 1.

When the type of the reference signal is the measurement reference signal, reference signal resources are divided into P2 groups of reference signal resources, and the terminal feeds back the reference signal parameter for each of the P2 groups of reference signal resources. P2 is an integer greater than 1.

When the type of the reference signal is a phase noise compensation reference signal, the transmission parameter includes one or more of:
- indication information about the number of symbols for transmitting a phase noise compensation reference signal;
- indication information about a time domain density of a resource for transmitting the phase noise compensation reference signal;
- indication information about a frequency domain density of the resource for transmitting the phase noise compensation reference signal;
- indication information about a position of the phase noise compensation reference signal;
- indication information about a sequence parameter of the phase noise compensation reference signal;
- indication information about a transmission power of the phase noise compensation reference signal; and
- indication information about precoding of the phase noise compensation reference signal;
- indication information about the number of precoding ports of the phase noise compensation reference signal; and
- indication information about a type of the phase noise compensation reference signal.

Figure 2:
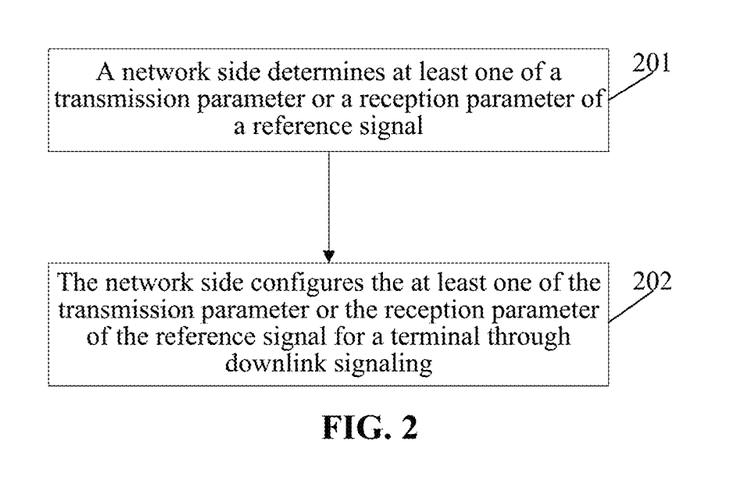
FIG. 2 is a flowchart of a method for configuring a reference signal parameter according to an embodiment of the present disclosure.

FIG. 2 is a flowchart of a method for configuring a reference signal parameter according to an embodiment of the present disclosure. As shown in FIG. 2, the method for configuring a reference signal parameter according to the embodiment of the present disclosure includes steps described below.

In a step 201, a network side determines at least one of a transmission parameter or a reception parameter of a reference signal.

In a step 202, the network side configures the at least one of the transmission parameter or the reception parameter of the reference signal for a terminal through downlink signaling.

A type of the reference signal is at least one of: a demodulation reference signal, a measurement reference signal or a phase noise compensation reference signal.

In the embodiment of the present disclosure, the network side is described by using a base station as an example, and another network element on the network side may also be used.

The base station configures the at least one of the transmission parameter or the reception parameter of the reference signal for a terminal through downlink signaling.

The base station configures the at least one of the transmission parameter or the reception parameter for each of a plurality of different transmission areas. The transmission areas are data transmission areas or control transmission areas.

The reception parameter includes one or more of: receive antenna information, receive port information, receive beam information and receive mode information.

When the reference signal is the demodulation reference signal, the transmission parameter includes indication information for a zero power demodulation reference signal.

When the reference signal is the demodulation reference signal, the transmission parameter includes indication information about a sequence type of the demodulation reference signal.

When the reference signal is the demodulation reference signal, the transmission parameter includes indication information about the number of repeated transmissions of demodulation reference signals having the same precoding.

When the reference signal is the demodulation reference signal, the transmission parameter includes indication information about a precoding binding granularity of the demodulation reference signal.

Demodulation reference signal resources are grouped, and the terminal feeds back the at least one of the transmission parameter or the reception parameter to each of a plurality of different demodulation reference signal resource groups. The resources are at least one of time domain resources, frequency domain resources, port resources, and beam resources.

When the reference signal is the measurement reference signal, the transmission parameter includes the number of measurement reference signal blocks to be transmitted.

When the reference signal is the measurement reference signal, the transmission parameter includes a rule for transmitting the measurement reference signal blocks.

When the reference signal is the measurement reference signal, the transmission parameter includes the number of time domain symbols included in the measurement reference signal blocks.

When the reference signal is the measurement reference signal, the transmission parameter includes a precoding/beam relationship between a plurality of measurement reference signals.

When the reference signal is the measurement reference signal, the transmission parameter includes the number of repeated transmissions of a reference signal corresponding to a same port.

When the reference signal is the measurement reference signal, the transmission parameter includes the number of repeated transmissions of reference signals having a same transmission mode. A transmission mode includes: a transmission beam, a transmission sequence and a transmission antenna.

When the reference signal is the measurement reference signal, a base station divides measurement reference signal resources into P2 groups of reference signal resources, and configures the at least one of the transmission parameter or the reception parameter for each of the P2 groups of reference signal resources. P2 is an integer greater than 1.

When the reference signal is a phase noise compensation reference signal, the transmission parameter includes indication information about the number of symbols for transmitting a phase noise compensation reference signal.

When the reference signal is the phase noise compensation reference signal, the transmission parameter includes indication information about a time domain density of a resource for transmitting the phase noise compensation reference signal.

When the reference signal is the phase noise compensation reference signal, the transmission parameter includes indication information about a frequency domain density of the resource for transmitting the phase noise compensation reference signal.

When the reference signal is the phase noise compensation reference signal, the transmission parameter includes indication information about a position of the phase noise compensation reference signal.

When the reference signal is the phase noise compensation reference signal, the transmission parameter includes indication information about a sequence parameter of the phase noise compensation reference signal.

When the reference signal is the phase noise compensation reference signal, the transmission parameter includes indication information about a transmission power of the phase noise compensation reference signal.

When the reference signal is a phase noise compensation reference signal, the transmission parameter includes indication information about the number of precoding ports of the phase noise compensation reference signal.

The essence of the technical solutions of the embodiments of the present disclosure is further illustrated by specific examples hereinafter.

Example 1

A transmission parameter of a demodulation reference signal is determined by a terminal and may include indication information about a sequence parameter of the demodulation reference signal. The sequence parameter of the demodulation reference signal may include a type of the sequence, for example, a Zadoff-off (ZC) sequence or a Pseudo-Noise (PN) sequence may be selected for the DMRS. The ZC sequence may be well used for time-frequency offset estimation. When other signals cannot be used for the time-frequency offset estimation or cannot meet some requirements of time-offset estimation or frequency offset estimation, or no other available reference signal exists for performing the time-frequency offset estimation, a base station may configure the ZC sequence for the terminal. If the time-frequency offset estimation information may be obtained by referring to other signals, a simpler PN sequence may be used. The number of frequency domain symbols that the PN sequence needs to occupy may be less, which is more advantageous for overhead. The PN sequence is a real sequence, which is also simpler in processing. The size of the actual frequency offset of the UE and the distance between the terminal and the base station needs to be considered for determining whether to configure the ZC sequence. If performance of the crystal oscillator of the UE is relatively good, the frequency offset is small, the terminal is close to the base station, and the delay is not large, a use of the PN sequence can be considered.

Correspondingly, the base station may use, by default, the transmission parameter of the demodulation reference signal determined by the terminal, such as the sequence parameter of the demodulation reference signal, and the parameter does not need to be configured again through downlink signaling. Of course, the base station may also have the final decision, and may take into account other factors to finally decide the sequence parameter of the demodulation reference signal which is then configured to the terminal. For example, the sequence is selected by furthering considering the possibility that multiple users simultaneously perform space division transmission, and cannot simply be determined by the recommended parameter of the terminal.

Example 2

Figure 3:
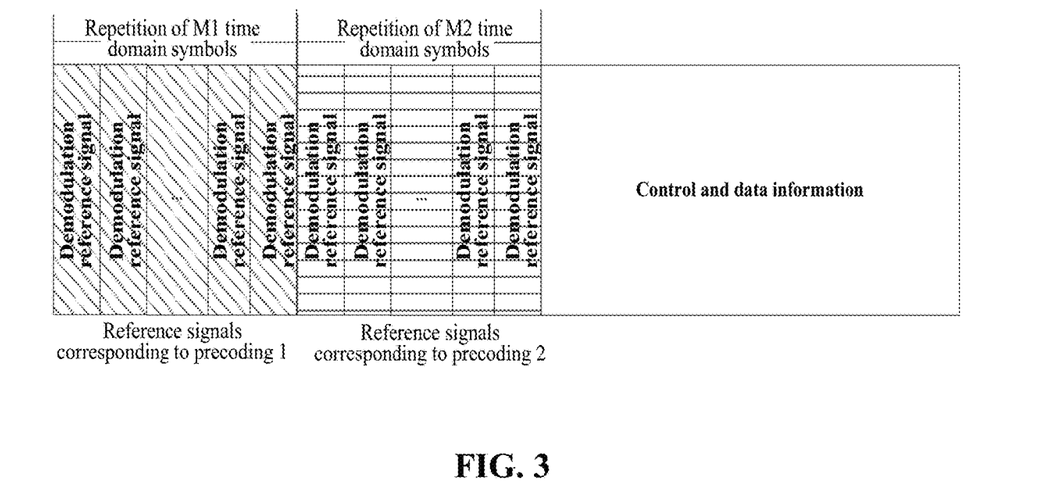
FIG. 3 is a schematic diagram of a correspondence between precoding and a reference signal according to an embodiment of the present disclosure.

A transmission parameter of a demodulation reference signal is determined by a terminal and may include indication information about the number of repeated transmissions of demodulation reference signals having the same precoding. The terminal may determine the parameter according to the configuration of a receive beam. Since the terminal expects at this time that the demodulation reference signals having the same precoding are repeatedly transmitted in the time domain for blind detection of the receive beam, the parameter is related to the setting of the receive beam. As shown in FIG. 3, the demodulation reference signals corresponding to the same precoding 1 are repeatedly transmitted on M1 time domain symbols, and the demodulation reference signals corresponding to the precoding 2 are repeatedly transmitted on M2 time domain symbols. M1 and M2 may be fed back from the terminal to the base station. The fed-back parameter represents a configuration value recommended by the terminal to the base station.

Merely the case of two different precodings corresponding to the demodulation reference signals is provided herein. The case of one precoding and the case of more precodings may be further included. In addition, it should be noted that the repeated transmission here is not limited to the continuous repeated transmission. The repeated transmission refers to that demodulation reference signals are transmitted on multiple time domain symbols by using the same precoding. The sequence of the demodulation reference signals is not limited. The transmission power of the demodulation reference signals and the transmission bandwidths of the demodulation reference signals are exactly the same.

Correspondingly, the base station may use, by default, the transmission parameter of the demodulation reference signal determined by the terminal, such as indication information about the number of repeated transmissions of demodulation reference signals having the same precoding, and the parameter does not need to be configured again through downlink signaling. Of course, the base station may also have the final decision, and may take into account other factors to finally decide the indication information about the number of repeated transmissions of demodulation reference signals having the same precoding which is then configured to the terminal.

Example 3

A transmission parameter of a demodulation reference signal is determined by a terminal and may include indication information about a precoding binding granularity of the demodulation reference signal. Optionally, the demodulation reference signal may be divided into multiple subcarrier groups or multiple resource block (RB) groups in the time domain, and the subcarrier groups or RB groups are defined and notified to a base station.

Correspondingly, the base station may use, by default, the transmission parameter of the demodulation reference signal determined by the terminal, such as indication information about a precoding binding granularity of the demodulation reference signal, and the parameter does not need to be configured again through downlink signaling. Of course, the base station may also have the final decision, and may take into account other factors to finally decide the indication information about a precoding binding granularity of the demodulation reference signal which is then configured to the terminal.

Example 4

A transmission parameter of a demodulation reference signal is determined by a terminal and may include indication information about the number of symbols for transmitting the demodulation reference signal or indication information about a time domain density of a resource for transmitting the demodulation reference signal. The number of symbols for transmitting the demodulation reference signal or the time domain density depends on the moving speed of the terminal. The terminal may estimate the moving speed of the terminal itself according to a characteristic of a measurement signal and considers in conjunction with the estimation result of the moving speed the appropriate number of symbols for transmitting the demodulation reference signal or density which are then recommended to a base station.

The transmission parameter of the demodulation reference signal is determined by the terminal and may include indication information about a frequency domain density of the resource for transmitting the demodulation reference signal. The indication information about send resource frequency domain density of the demodulation reference signal depends on the richness of the multipath, and is related to the scenario in which the terminal is located. The terminal may estimate the frequency domain selective fading size, i.e., the frequency domain correlation size, according to the characteristics of some measurement signals, and recommend an appropriate demodulation reference signal frequency domain density to the base station. Similarly, since the terminal is clearer about the frequency domain correlation, the terminal may recommend the frequency domain density of the precoding for the demodulation reference signal to the base station. The binding refers to that reference signals on a segment of frequency domain resources are restricted to having the same precoding. Such method may improve the DMRS demodulation performance but will limit the precoding flexibility. The advantages and disadvantages of different channels have different effects on performance. The terminal may estimate, according to the measured channel characteristics, the losses of performance and the gains of the DMRS frequency domain precoding bindings caused by different granularity bindings, thereby recommending appropriate binding granularity.

The transmission parameter of the demodulation reference signal is determined by the terminal and may further include indication information about a position of transmitting the demodulation reference signal. Information about the time-frequency density, the number of symbols and the number of subcarriers is implicit in the position indication information.

Correspondingly, the base station may use, by default, the transmission parameter of the demodulation reference signal determined by the terminal, such as indication information about the number of symbols for transmitting the demodulation reference signal or indication information about a time domain density of a resource for transmitting the demodulation reference signal or indication information about a position of transmitting the demodulation reference signal, and the parameter does not need to be configured again through downlink signaling. Of course, the base station may also have the final decision, and may take into account other factors to finally decide the indication information about the number of symbols for transmitting the demodulation reference signal or the indication information about a time domain density of a resource for transmitting the demodulation reference signal or the indication information about a position of transmitting the demodulation reference signal which are then configured to the terminal.

Example 5

The transmission parameter of the demodulation reference signal is determined by the terminal and may include indication information about a transmission power of the demodulation reference signal. The transmission power may be a relative value, may be a power difference between different ports of the demodulation reference signal, a power difference between demodulation reference signals on different beams or having different precodings, or a power difference between the demodulation reference signal transmission and data information transmission, or a power difference between the demodulation reference signal transmission and control information transmission.

Correspondingly, the base station may use, by default, the transmission parameter of the demodulation reference signal determined by the terminal, such as indication information about a transmission power of the demodulation reference signal, and the parameter does not need to be configured again through downlink signaling. Of course, the base station may also have the final decision, and may take into account other factors to finally decide the indication information about a transmission power of the demodulation reference signal which is then configured to the terminal.

Example 6

A reception parameter of a demodulation reference signal is determined by a terminal and may include receive antenna information of the demodulation reference signal, receive port information of the demodulation reference signal, receive beam information of the demodulation reference signal and receive mode information of the demodulation reference signal. When the receiving end has multiple receive antennas, the terminal may inform the base station of the receive antenna to be used for receiving the demodulation reference signal. When the receiving end has multiple receive ports, the terminal may inform the base station the receive port to be used for receiving the demodulation reference signal. When the receiving end has multiple receive beams, the terminal may inform the base station the receive beam to be used for receiving the demodulation reference signal. When the receiving end has multiple receive modes, the terminal may inform the base station of the to-be-used mode of receiving the demodulation reference signal.

In condition that multiple demodulation reference signal resource groups exist, the terminal may feed back the corresponding reception parameter of the demodulation reference signal to each of the multiple demodulation reference signal resource groups.

Correspondingly, the base station may use, by default, the reception parameter of the demodulation reference signal determined by the terminal, such as the receive antenna information of the demodulation reference signal, the receive port information of the demodulation reference signal, the receive beam information of the demodulation reference signal and the receive mode information of the demodulation reference signal, and the parameter does not need to be configured again through downlink signaling. Of course, the base station may also have the final decision, and may take into account other factors to finally decide the receive antenna information of the demodulation reference signal, the receive port information of the demodulation reference signal, the receive beam information of the demodulation reference signal and the receive mode information of the demodulation reference signal which are then configured to the terminal.

In condition that multiple demodulation reference signal resource groups exist, the base station may configure the corresponding reception parameter of the demodulation reference signal to each of the multiple demodulation reference signal resource groups.

Example 7

The base station agrees on with the terminal agree on a set having X1 sets of demodulation reference signal parameters in which one or more types of one or more types parameters mentioned in the foregoing embodiments are included. A difference exists in the value of one or more parameters between every two sets of the set having X1 sets of demodulation reference signal parameters. The terminal selects Y1 sets of demodulation reference signal parameters from the set having X1 sets of demodulation reference signal parameters and feeds back the corresponding indication information to the base station. Y1 is a positive integer less than or equal to X1.

Example 8

A terminal may group the demodulation reference signal resources, and feeds back at least one of some of the transmission and reception parameters mentioned in the foregoing embodiments for each of the plurality of different demodulation reference signal resource groups. Multiple modes of grouping are provided. One mode is to group, according to the ports, into multiple demodulation reference signal port groups, for example, different ports are grouped into different groups, and of course, multiple ports may be included in one group. Another mode is to group, according to time domain symbols, the time domain symbols on which the demodulation reference signals are located into a plurality of symbol groups. Grouping may also be performed in the frequency domain, for example, multiple segments of frequency domain resources are divided into, and the demodulation reference signals on each segment of frequency domain resources are in a group. Or demodulation reference signals transmitted on different beams are divided into different groups. Then the terminal feeds back the reference signal parameter for each group of demodulation reference signals.

Correspondingly, the base station may also group the demodulation reference signal resources, and configures at least one of some of the send and reception parameters mentioned in the foregoing embodiments for each of a plurality of different resource groups. The base station and the terminal may use the same mode of grouping, and may also use a separate mode of grouping.

Example 9

Multiple types of control channels can exist in the uplink or downlink. Different control channels have different transmission parameters. Some control channels have good robustness and some control channels have high transmission efficiency. The terminal may configure at least one of the transmission parameter or the reception parameter for each of the multiple types of control channels.

Multiple transmission areas may exist in the uplink or downlink control channel or in the uplink or downlink data channel. In this case, the terminal feeds back at least one of the transmission parameter or the reception parameter for each of the multiple different transmission areas.

Example 10

Figure 4:
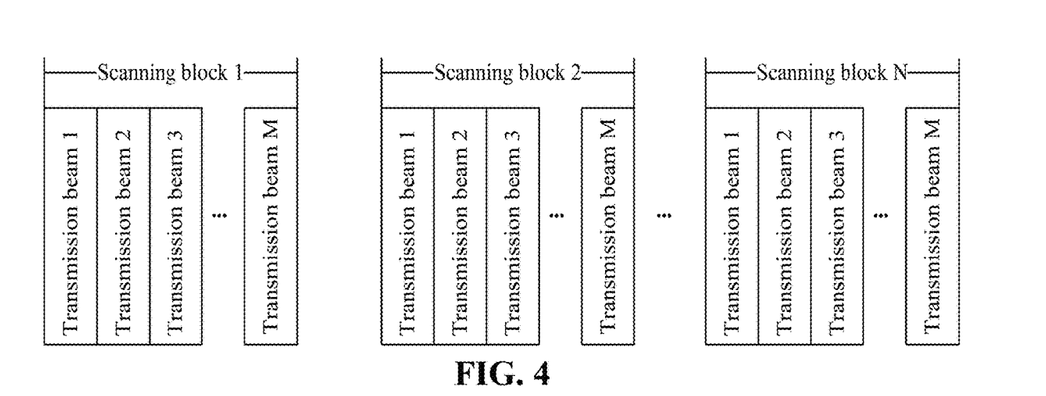
FIG. 4 is a schematic diagram illustrating a mode of transmitting a measurement reference signal according to an embodiment of the present disclosure.

The uplink and downlink measurement reference signals are transmitted in multiple modes, and one mode of transmitting the measurement reference signal is as shown in FIG. 4.

In the above mode, M different beams may be transmitted on each scanning block, and M beams may occupy different time domain symbols. The receiving end may perform measurement and select the best beam. Since the receiving end may also have multiple antennas and multiple receive beams may be formed, the transmitting end may periodically send these scanning blocks, or send N scanning blocks for multiple times in succession, so that the receiving end performs measurement on the quality of transmission beams corresponding to different receive beams. It should be noted that although the transmission beams in every scanning block are the same in the given example herein, a case where the transmission beams in every scanning block are not identical also exists. The numbers of symbols and the numbers of beams transmitted in the measurement reference signal blocks may also be different.

Figure 5:
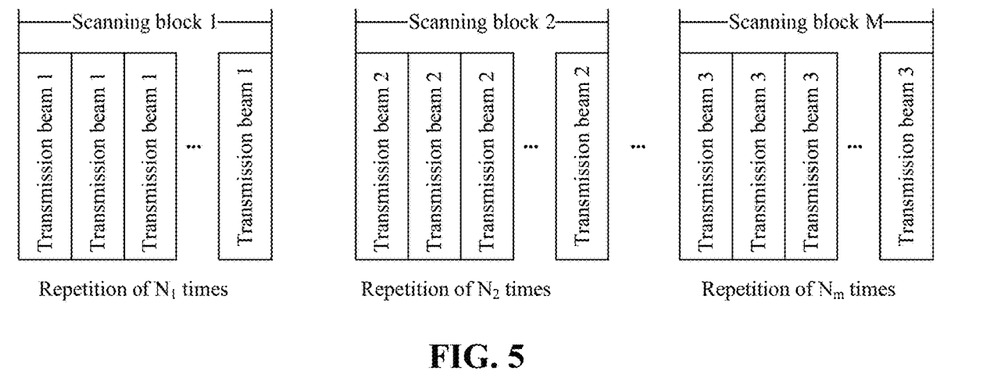
FIG. 5 is a schematic diagram illustrating a second mode of transmitting a measurement reference signal according to an embodiment of the present disclosure.

In addition to the above mode, another transmission case is described as shown in FIG. 5. Multiple same transmission beams are included in one scanning block, and different scanning blocks correspond to different transmission beams. The receiving end may also complete measurement and selection of the receive and transmission beams.

Figure 6:
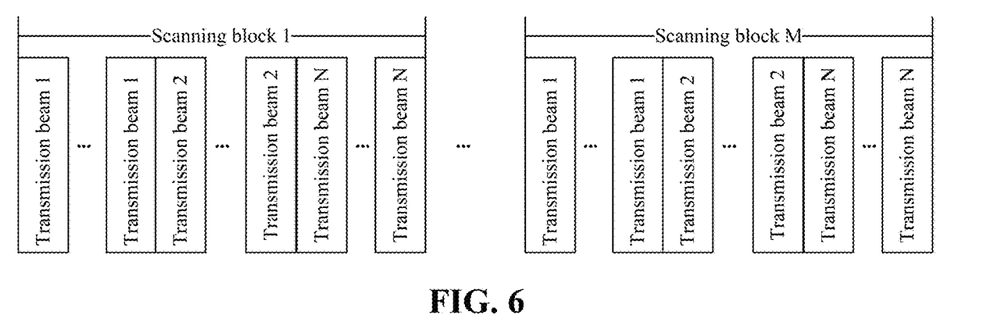
FIG. 6 is a schematic diagram illustrating a third mode of transmitting a measurement reference signal according to an embodiment of the present disclosure.

As shown in FIG. 6, another mode of merging is further provided. Multiple beams are transmitted in one scanning block, and each beam may be repeated for multiple times.

Transmission of the measurement reference signal mentioned above is merely transmission at one port. A beam may be changed on a symbol in a different time domain for a port and a different beam may be transmitted. In fact, existence of multiple ports at the same time on a time domain symbol may also be included, and each port may correspond to a transmit-antenna channel. On the same time domain symbol, beams in the same direction or in different directions may be transmitted on each antenna channel beams.

For the above transmitting modes, different modes correspond to different transmitting rules, and the terminal may determine the transmitting rule of the measurement reference signal block according to its own capability of switching of the transmission beam or the receive beam, and feeds back the transmitting rule to the base station. Correspondingly, the base station may use, by default, the transmission parameter of the measurement reference signal determined by the terminal, such as a rule for transmitting a measurement reference signal block, and the parameter does not need to be configured again through downlink signaling. Of course, the base station may also have the final decision, and may take into account other factors to finally decide the rule for transmitting a measurement reference signal block which is then configured to the terminal.

The number of time domain symbols included in the measurement reference signal block may also be determined by the terminal and fed back to the base station. The number of time domain symbols generally implies setting information of the number of receive beams or the number of transmission beams. The terminal is clearer about its own beam setting. Correspondingly, the base station may use, by default, the transmission parameter of the measurement reference signal determined by the terminal, such as the number of time domain symbols included in the measurement reference signal block, and the parameter does not need to be configured again through downlink signaling. Of course, the base station may also have the final decision, and may take into account other factors to finally decide the number of time domain symbols included in the measurement reference signal block which is then configured to the terminal.

The transmission parameter of the measurement reference signal is determined by the terminal, and may include the number of measurement reference signal blocks to be transmitted. The number of measurement reference signal blocks to be transmitted also implies setting information of the number of receive beams or the number of transmission beams. Since the terminal is relatively clear about the number of receive or transmission beams that the terminal expects to train, a parameter of the number of scanning blocks to be transmitted, which may also be referred to as the number of measurement reference signal blocks to be transmitted, may be transmitted to the base station. Correspondingly, the base station may use, by default, the transmission parameter of the measurement reference signal determined by the terminal, such as the number of measurement reference signal blocks to be transmitted, and the parameter does not need to be configured again through downlink signaling. Of course, the base station may also have the final decision, and may take into account other factors to finally decide the number of measurement reference signal blocks to be transmitted which is then configured to the terminal.

In addition to the above information, the number of repeated transmissions of the measurement reference signal may also be determined by the terminal and includes: the number of repeated transmissions of a reference signal corresponding to a same port; or the number of repeated transmissions of reference signals having a same transmission mode; or the number of repeated transmissions of reference signals transmitted in the same mode in a same reference signal resource block; or the number of repeated transmissions of reference signal resource blocks having a same transmission mode; or the number of repeated transmissions of a reference signal corresponding to a same beam. Correspondingly, the base station may use, by default, the transmission parameter of the measurement reference signal determined by the terminal, such as the number of repeated transmissions of the measurement reference signal, and the parameter does not need to be configured again through downlink signaling. Of course, the base station may also have the final decision, and may take into account other factors to finally decide the number of repeated transmissions of the measurement reference signal which is then configured to the terminal.

Example 11

A transmission parameter of a measurement reference signal is determined by a terminal and may be indication information about precoding corresponding to the measurement reference signal. The information is used for indicating the precoding of the measurement reference signal, that is, the mode of forming a beam. Correspondingly, a base station may use, by default, the transmission parameter of the measurement reference signal determined by the terminal, such as the precoding corresponding to the measurement reference signal, and the parameter does not need to be configured again through downlink signaling. Of course, the base station may also have the final decision, and may take into account other factors to finally decide the precoding corresponding to the measurement reference signal which is then configured to the terminal.

A set of candidate precodings and an optional precoding set corresponding to the measurement reference signal may also be determined by the terminal and fed back to the base station, and the base station may select precoding from the set for beam generation. Correspondingly, the base station selects the precoding corresponding to the measurement reference signal which is then configured to the terminal.

The terminal may also feed back a binding relationship of precodings or beams in the resource block of the measurement reference signal. For example, when a certain beam is transmitted, multiple time domain symbols or frequency domain resources need to be bound. Correspondingly, the base station may use, by default, the transmission parameter of the measurement reference signal determined by the terminal, such as the binding relationship of precodings or beams, and the parameter does not need to be configured again through downlink signaling. Of course, the base station may also have the final decision, and may take into account other factors to finally decide the binding relationship of precodings or beams which is then configured to the terminal.

Example 12

A reception parameter of a measurement reference signal is determined by a terminal and may include receive antenna information of the measurement reference signal, receive port information of the measurement reference signal, receive beam information of the measurement reference signal and receive mode information of the measurement reference signal. When the receiving end has multiple receive antennas, the terminal may inform the base station of the receive antenna to be used for receiving the measurement reference signal. When the receiving end has multiple receive ports, the terminal may inform the base station the receive port to be used for receiving the measurement reference signal. When the receiving end has multiple receive beams, the terminal may inform the base station the receive beam to be used for receiving the measurement reference signal. When the receiving end has multiple receive modes, the terminal may inform the base station of the to-be-used mode of receiving the measurement reference signal.

In condition that multiple sets of measurement reference signals exist, the terminal may feed back the corresponding reception parameter of the measurement reference signal to each of the multiple sets of measurement reference signals.

Correspondingly, the base station may use, by default, the reception parameter of the measurement reference signal determined by the terminal, such as the receive antenna information of the measurement reference signal, the receive port information of the measurement reference signal, the receive beam information of the measurement reference signal and the receive mode information of the measurement reference signal, and the parameter does not need to be configured again through downlink signaling. Of course, the base station may also have the final decision, and may take into account other factors to finally decide the receive antenna information of the measurement reference signal, the receive port information of the measurement reference signal, the receive beam information of the measurement reference signal and the receive mode information of the measurement reference signal which are then configured to the terminal.

In condition that multiple sets of measurement reference signals exist, the base station may configure the corresponding reception parameter of the measurement reference signal to each of the multiple sets of measurement reference signals.

Example 13

When multiple types of measurement reference signals exist, the multiple types of measurement reference signals are divided into P1 groups. The terminal feeds back the reference signal parameter, including at least one of a transmission parameter or a reception parameter, for each of the P1 groups of measurement reference signals. P1 is an integer greater than 1.

When multiple sets of measurement reference signals exist, the multiple sets of measurement reference signals are divided into P2 groups of reference signal resources. The terminal feeds back the reference signal parameter, including at least one of a transmission parameter or a reception parameter, for each of the P2 groups of measurement reference signals. P2 is an integer greater than 1.

Example 14

A transmission parameter of a phase noise compensation reference signal is determined by a terminal and may include indication information about the number of symbols for transmitting the phase noise compensation reference signal, such as the number of occupied symbols in one subframe or the number of occupied symbols in one slot. Correspondingly, the base station may use, by default, the transmission parameter of the phase noise compensation reference signal determined by the terminal, such as the indication information about the number of symbols for transmitting the phase noise compensation reference signal, and the parameter does not need to be configured again through downlink signaling. Of course, the base station may also have the final decision, and may take into account other factors to finally decide the indication information about the number of symbols for transmitting the phase noise compensation reference signal which is then configured to the terminal.

Example 15

A transmission parameter of a phase noise compensation reference signal is determined by a terminal and may include indication information about a time domain density of a resource for transmitting the phase noise compensation reference signal. Correspondingly, the base station may use, by default, the transmission parameter of the phase noise compensation reference signal determined by the terminal, such as the indication information about a time domain density of a resource for transmitting the phase noise compensation reference signal, and the parameter does not need to be configured again through downlink signaling. Of course, the base station may also have the final decision, and may take into account other factors to finally decide the indication information about a time domain density of a resource for transmitting the phase noise compensation reference signal which is then configured to the terminal.

Example 16

A transmission parameter of a phase noise compensation reference signal is determined by a terminal and may include indication information about a frequency domain density of a resource for transmitting the phase noise compensation reference signal, such as an interval between phase noise compensation reference signals in the frequency domain. Correspondingly, the base station may use, by default, the transmission parameter of the phase noise compensation reference signal determined by the terminal, such as the indication information about a frequency domain density of a resource for transmitting the phase noise compensation reference signal, and the parameter does not need to be configured again through downlink signaling. Of course, the base station may also have the final decision, and may take into account other factors to finally decide the indication information about a frequency domain density of a resource for transmitting the phase noise compensation reference signal which is then configured to the terminal.

Example 17

A transmission parameter of a phase noise compensation reference signal is determined by a terminal and may include indication information about a position of the phase noise compensation reference signal, such as a pattern of the phase noise compensation reference signal. Correspondingly, the base station may use, by default, the transmission parameter of the phase noise compensation reference signal determined by the terminal, such as the indication information about a position of the phase noise compensation reference signal, and the parameter does not need to be configured again through downlink signaling. Of course, the base station may also have the final decision, and may take into account other factors to finally decide the indication information about a position of the phase noise compensation reference signal which is then configured to the terminal.

Example 18

A transmission parameter of a phase noise compensation reference signal is determined by a terminal and may include indication information about a sequence parameter of the phase noise compensation reference signal, such as indication of a type of a sequence and indication of an initialization parameter of the sequence. Correspondingly, the base station may use, by default, the transmission parameter of the phase noise compensation reference signal determined by the terminal, such as the indication information about a sequence parameter of the phase noise compensation reference signal, and the parameter does not need to be configured again through downlink signaling. Of course, the base station may also have the final decision, and may take into account other factors to finally decide the indication information about a sequence parameter of the phase noise compensation reference signal which is then configured to the terminal.

Example 19

A transmission parameter of a phase noise compensation reference signal is determined by a terminal and may include indication information about a transmission power of the phase noise compensation reference signal, such as an absolute value of the transmission power, or a power offset relative to the demodulation reference signal, or a power offset relative to the data, or a power offset relative to the synchronization signal, or a power offset relative to the control channel, or a power offset relative to the measurement reference signal etc. Correspondingly, the base station may use, by default, the transmission parameter of the phase noise compensation reference signal determined by the terminal, such as the indication information about a sequence parameter of the phase noise compensation reference signal, and the parameter does not need to be configured again through downlink signaling. Of course, the base station may also have the final decision, and may take into account other factors to finally decide the indication information about a sequence parameter of the phase noise compensation reference signal which is then configured to the terminal.

Example 20

A reception parameter of a phase noise compensation reference signal is determined by a terminal and may include receive antenna information of the phase noise compensation reference signal, receive port information of the phase noise compensation reference signal, receive beam information of the phase noise compensation reference signal and receive mode information of the phase noise compensation reference signal. When the receiving end has multiple receive antennas, the terminal may inform the base station of the receive antenna to be used for receiving the phase noise compensation reference signal. When the receiving end has multiple receive ports, the terminal may inform the base station the receive port to be used for receiving the phase noise compensation reference signal. When the receiving end has multiple receive beams, the terminal may inform the base station the receive beam to be used for receiving phase noise compensation reference signal. When the receiving end has multiple receive modes, the terminal may inform the base station of the to-be-used mode of receiving the phase noise compensation reference signal.

If multiple sets of phase noise compensation reference signals exist, the terminal may feed back the corresponding reception parameter of the phase noise compensation reference signal to each of the multiple sets of phase noise compensation reference signals.

Correspondingly, the base station may use, by default, the reception parameter of the phase noise compensation reference signal determined by the terminal, such as the receive antenna information of the phase noise compensation reference signal, the receive port information of the phase noise compensation reference signal, the receive beam information of the phase noise compensation reference signal and the receive mode information of the phase noise compensation reference signal, and the parameter does not need to be configured again through downlink signaling. Of course, the base station may also have the final decision, and may take into account other factors to finally decide the receive antenna information of the phase noise compensation reference signal, the receive port information of the phase noise compensation reference signal, the receive beam information of the phase noise compensation reference signal and the receive mode information of the phase noise compensation reference signal which are then configured to the terminal.

In condition that multiple sets of phase noise compensation reference signals exist, the base station may configure the corresponding reception parameter of the phase noise compensation reference signal to each of the multiple sets of phase noise compensation reference signals.

Figure 7:
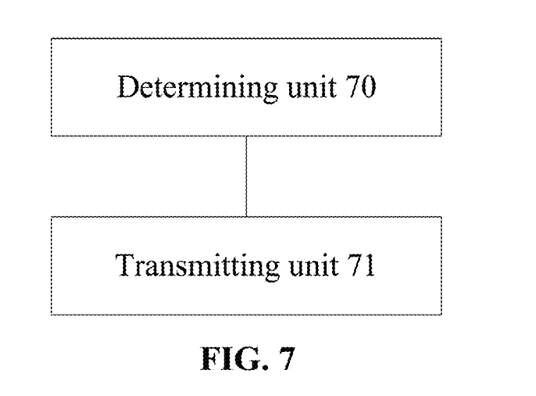
FIG. 7 is a structural diagram of a device for feeding back a reference signal parameter according to an embodiment of the present disclosure.

FIG. 7 is a structural diagram of a device for feeding back a reference signal parameter according to an embodiment of the present disclosure. As shown in FIG. 7, the device for feeding back a reference signal parameter according to the embodiment of the present disclosure includes a determining unit 70 and a transmitting unit 71.

The determining unit is configured to determine at least one of a transmission parameter or a reception parameter of a reference signal.

The transmitting unit 71 is configured to feed back the at least one of the transmission parameter or the reception parameter of the reference signal to a base station. A type of the reference signal is at least one of: a demodulation reference signal, a measurement reference signal or a phase noise compensation reference signal.

The reception parameter includes at least one of: receive antenna information, receive port information, receive beam information or receive mode information.

When the type of the reference signal is the demodulation reference signal, the transmission parameter includes at least one of:
  indication information about the number of repeated transmissions of demodulation reference signals having same precoding;
  indication information about the number of symbols for transmitting the demodulation reference signal;
  indication information about a time domain density of a resource for transmitting the demodulation reference signal;
  indication information about a frequency domain density of the resource for transmitting the demodulation reference signal;
  indication information about a position of the demodulation reference signal; or
  indication information about a sequence parameter of the demodulation reference signal.

The sequence parameter includes: a sequence type, indication information about a transmission power of the demodulation reference signal, and indication information about a precoding binding granularity of the demodulation reference signal.

When the type of the reference signal is the measurement reference signal, the transmission parameter includes at least one of:
  the number of measurement reference signal blocks to be transmitted;
  a rule for transmitting the measurement reference signal blocks;
  the number of time domain symbols comprised in the measurement reference signal blocks;
  the number of repeated transmissions of the measurement reference signal;
  indication information about precoding corresponding to the measurement reference signal;
  information about an optional precoding set corresponding to the measurement reference signal; or
  a precoding/beam relationship between a plurality of measurement reference signals.

It should be understood by those skilled in the art that implementation of functions of one or more units of the device for feeding back a reference signal parameter in FIG. 7 may be understood with reference to the relevant description of the foregoing method for feeding back a reference signal parameter. The determination unit or the like shown in FIG. 7 may be implemented by a microprocessor, a field programmable gate array (FPGA), a digital signal processor, and the like. The transmitting unit may be implemented by an antenna system.

Figure 8:
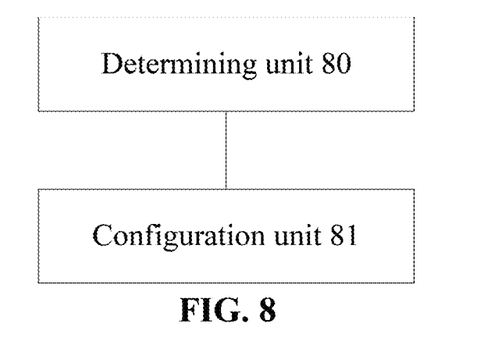
FIG. 8 is a structural diagram for a device for configuring a reference signal parameter according to an embodiment of the present disclosure.

FIG. 8 is a structural diagram of a device for configuring a reference signal parameter according to an embodiment of the present disclosure. As shown in FIG. 8, the device for configuring a reference signal parameter according to the embodiment of the present disclosure includes a determining unit 80 and a configuration unit 81.

The determining unit 80 is configured to determine at least one of a transmission parameter or a reception parameter of a reference signal.

The configuration unit 81 is configured to configure the at least one of the transmission parameter or the reception parameter of the reference signal for a terminal through downlink signaling. A type of the reference signal is at least one of: a demodulation reference signal, a measurement reference signal or a phase noise compensation reference signal.

The configuration unit 81 is further configured to perform an operation described below.

The at least one of the transmission parameter or the reception parameter is configured for each of a plurality of different transmission areas. The transmission areas are data transmission areas or control transmission areas.

The reception parameter includes at least one of: receive antenna information, receive port information, receive beam information or receive mode information.

It should be understood by those skilled in the art that implementation of functions of one or more units of the device for configuring a reference signal parameter in FIG. 8 may be understood with reference to the relevant description of the foregoing method for configuring a reference signal parameter. The determination unit or the like shown in FIG. 8 may be implemented by a microprocessor, an FPGA, a digital signal processor, and the like. The configuration unit may be implemented by a processor or a processing chip or the like having an antenna system.

Figure 9:
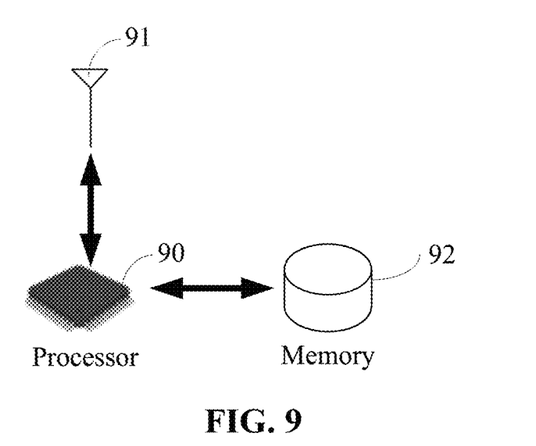
FIG. 9 is a structural diagram of a user terminal according to an embodiment of the present disclosure.

FIG. 9 is a structural diagram of a user terminal according to an embodiment of the present disclosure. As shown in FIG. 9, the user terminal according to the embodiment of the present disclosure includes a processor 90, an antenna system 91, a memory 92 and the like.

The processor 90 is configured to determine at least one of a transmission parameter or a reception parameter of a reference signal.

The antenna system 91 is configured to feed back the at least one of the transmission parameter or the reception parameter of the reference signal to a base station.

The processor 92 stores executable instructions of the processor 90, and is configured to support communication applications and the like of the user equipment.

A type of the reference signal is at least one of: a demodulation reference signal, a measurement reference signal or a phase noise compensation reference signal.

In the embodiment of the present disclosure, when the type of the reference signal is the demodulation reference signal, the transmission parameter includes at least one of:
  indication information about the number of repeated transmissions of demodulation reference signals having same precoding;
  indication information about the number of symbols for transmitting the demodulation reference signal;
  indication information about a time domain density of a resource for transmitting the demodulation reference signal;

indication information about a frequency domain density of the resource for transmitting the demodulation reference signal;

indication information about a position of the demodulation reference signal; or indication information about a sequence parameter of the demodulation reference signal.

The sequence parameter includes: a sequence type, indication information about a transmission power of the demodulation reference signal, and indication information about a precoding binding granularity of the demodulation reference signal.

In the embodiment of the present disclosure, when the reference signal is the measurement reference signal, the transmission parameter includes at least one of:

the number of measurement reference signal blocks to be transmitted;

a rule for transmitting the measurement reference signal blocks;

the number of time domain symbols included in the measurement reference signal blocks;

the number of repeated transmissions of the measurement reference signal;

indication information about precoding corresponding to the measurement reference signal;

information about an optional precoding set corresponding to the measurement reference signal; or a precoding/beam relationship between a plurality of measurement reference signals.

In the embodiment of the present disclosure, relevant functions that can be performed by the user terminal may be understood with reference to the foregoing relevant description of the method and device for configuring a reference signal parameter, and details are not described herein again.

Figure 10:
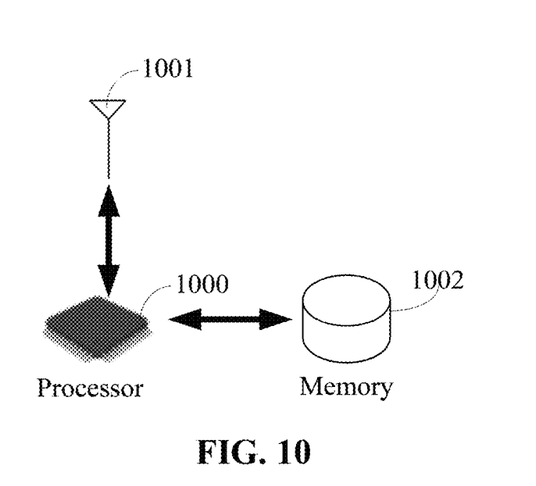
FIG. 10 is a structural diagram of a base station according to an embodiment of the present disclosure.

FIG. 10 is a structural diagram of a base station according to an embodiment of the present disclosure. As shown in FIG. 10, the base station according to the embodiment of the present disclosure includes a processor 1000, an antenna system 1001, a processor 1002 and the like.

The processor 1000 is configured to determine at least one of a transmission parameter or a reception parameter of a reference signal.

The antenna system 1001 is configured to configure the at least one of the transmission parameter or the reception parameter of the reference signal for a terminal through downlink signaling.

The processor 1002 stores executable instructions of the processor 1000, and is configured to support communication applications and the like of the user equipment.

In the embodiment of the present disclosure, a type of the reference signal is at least one of: a demodulation reference signal, a measurement reference signal or a phase noise compensation reference signal.

The processor 1000 is further configured to configure at least one of the transmission parameter or the reception parameter for each of a plurality of different transmission areas. The transmission areas are data transmission areas or control transmission areas.

In the embodiment of the present disclosure, relevant functions that can be performed by the base station may be understood with reference to the foregoing relevant description of the method and device for feeding back a reference signal parameter, and details are not described herein again.

An embodiment of the present disclosure further provides a computer-readable storage medium configured to store computer-executable instructions which, when executed by a processor, execute the method described in the above embodiments.

It should be understood that the devices and the methods disclosed in the embodiments of the present disclosure may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of the solutions in the embodiments of the present disclosure.

Moreover, various function units in the embodiments of the present disclosure may all be integrated in one processing unit, or each unit may be used as a separate unit, or two or more units may be integrated into one unit. The integrated function unit may be implemented by hardware or may be implemented by hardware plus a software function unit.

It should be understood by those skilled in the art that functional modules/units in all or part of the steps of the method, the system and the apparatus disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other media used for storing desired information and accessed by a computer. In addition, as is known to those skilled in the art, the communication medium generally includes the computer-readable instructions, the data structures, the program modules, or other data in modulated data signals such as carriers or other transmission mechanisms, and may include any information delivery medium. The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

What is claimed is:

1. A method for feeding back a reference signal parameter, comprising:
   determining, by a terminal, at least one of a transmission parameter or a reception parameter of a reference signal; and
   feeding back, by the terminal, the at least one of the transmission parameter or the reception parameter of the reference signal to a base station;
   wherein when the reception parameter of the reference signal is determined by the terminal, the reception parameter comprises at least one of: receive antenna information, receive port information, receive beam information or receive mode information;
   wherein when the transmission parameter of the reference signal is determined by the terminal and in condition that the reference signal is a measurement reference signal, the transmission parameter comprises at least one of:
   a number of time domain symbols comprised in the measurement reference signal blocks; or
   a precoding/beam relationship between a plurality of measurement reference signals;
   wherein the measurement reference signal is used for downlink and uplink channel state information (CSI) measurement;
   wherein the number of time domain symbols implies setting information of a number of receive beams or a number of transmission beams;
   wherein the transmission parameter or the reception parameter of the reference signal is configured for transmitting or receiving the reference signal;
   wherein receive antenna information is configured for informing the base station of the receive antenna to be used for receiving a desired measurement reference signal;
   wherein the receive port information is configured for informing the base station of the receive port to be used for receiving the desired measurement reference signal;
   wherein the receive mode information is configured for informing the base station of the to-be-used mode of receiving the desired measurement reference signal;
   wherein the measurement reference signal comprises: downlink channel state information reference signal (CSI-RS) and uplink sounding reference signal (SRS), the receive beam information is configured for informing the base station of which receive beam at the terminal to be used at the terminal for receiving the downlink CSI-RS in the measurement reference signal.

2. The method of claim 1, wherein when the transmission parameter of the reference signal is determined by the terminal and in condition that a type of the reference signal is a demodulation reference signal, the transmission parameter comprises at least one of:
   indication information about a number of repeated transmissions of demodulation reference signals having same precoding;
   indication information about a number of symbols for transmitting the demodulation reference signal;
   indication information about a time domain density of a resource for transmitting the demodulation reference signal;
   indication information about a frequency domain density of the resource for transmitting the demodulation reference signal;
   indication information about a position of the demodulation reference signal; or
   indication information about a sequence parameter of the demodulation reference signal;
   wherein the sequence parameter comprises: a sequence type, indication information about a transmission power of the demodulation reference signal, and indication information about a precoding binding granularity of the demodulation reference signal.

3. The method of claim 1, wherein in condition that a type of the reference signal is a demodulation reference signal, demodulation reference signal resources are grouped; and
   wherein the feeding back, by the terminal, the at least one of the transmission parameter and the reception parameter of the reference signal to the base station comprises:
   feeding back, by the terminal, the at least one of the transmission parameter and the reception parameter to each of a plurality of different demodulation reference signal resource groups.

4. The method of claim 1, wherein in condition that a type of the reference signal is a demodulation reference signal, the feeding back, by the terminal, the at least one of the transmission parameter or the reception parameter of the reference signal to the base station comprises:
   feeding back, by the terminal, the at least one of the transmission parameter or the reception parameter for each of a plurality of types of control channel configurations.

5. The method of claim 1, wherein in condition that a type of the reference signal is a demodulation reference signal, the feeding back, by the terminal, the at least one of the transmission parameter or the reception parameter of the reference signal to the base station comprises:
   feeding back, by the terminal, the at least one of the transmission parameter or the reception parameter for each of a plurality of different transmission areas, wherein the transmission areas are data transmission areas or control transmission areas.

6. The method of claim 1, wherein the number of repeated transmissions comprises:
   a number of repeated transmissions of a reference signal corresponding to a same port; or a number of repeated transmissions of reference signals having a same transmission mode; or a number of repeated transmissions of reference signals having a same transmission mode in a same reference signal resource block; or a number of repeated transmissions of reference signal resource blocks having a same transmission mode; or a number of repeated transmissions of a reference signal corresponding to a same beam.

7. The method of claim 1, further comprising:
   in condition that the reference signal is a measurement reference signal, feeding back, by the terminal, the reference signal parameter for each of P1 types of measurement reference signals, wherein P1 is an integer greater than 1.

8. The method of claim 1, further comprising:
   in condition that the reference signal is a measurement reference signal, dividing reference signal resources into P2 groups of reference signal resources, and feeding back, by the terminal, the reference signal parameter for each of the P2 groups of reference signal resources, wherein P2 is an integer greater than 1.

9. The method of claim 1, wherein when the transmission parameter of the reference signal is determined by the terminal and in condition that a type of the reference signal is a phase noise compensation reference signal, the transmission parameter comprises at least one of:
indication information about a time domain density of a resource for transmitting the phase noise compensation reference signal;
indication information about a frequency domain density of the resource for transmitting the phase noise compensation reference signal;
indication information about a position of the phase noise compensation reference signal;
indication information about a sequence parameter of the phase noise compensation reference signal;
indication information about a transmission power of the phase noise compensation reference signal;
indication information about precoding of the phase noise compensation reference signal;
indication information about a number of precoding ports of the phase noise compensation reference signal; or
indication information about a type of the phase noise compensation reference signal.

10. A user terminal, comprising: a processor and an antenna system, wherein
the processor is configured to determine at least one of a transmission parameter and a reception parameter of a reference signal; and
the antenna system is configured to feed back the at least one of the transmission parameter and the reception parameter of the reference signal to a base station;
wherein when the transmission parameter of the reference signal is determined by the terminal and in condition that the reference signal is a measurement reference signal, the transmission parameter comprises at least one of:
a number of time domain symbols comprised in the measurement reference signal blocks; or
a precoding/beam relationship between a plurality of measurement reference signals;
wherein the measurement reference signal is used for downlink and uplink channel state information (CSI) measurement;
the number of time domain symbols implies setting information of a number of receive beams or a number of transmission beams;
wherein the reception parameter comprises at least one of: receive antenna information, receive port information, receive beam information or receive mode information;
wherein the transmission parameter or the reception parameter of the reference signal is configured for transmitting or receiving the reference signal;
wherein receive antenna information is configured for informing the base station of the receive antenna to be used for receiving a desired measurement reference signal;
wherein the receive port information is configured for informing the base station of the receive port to be used for receiving the desired measurement reference signal;
wherein the receive mode information is configured for informing the base station of the to-be-used mode of receiving the desired measurement reference signal;
wherein the measurement reference signal comprises: downlink channel state information reference signal (CSI-RS) and uplink sounding reference signal (SRS), the receive beam information is configured for informing the base station of which receive beam at the terminal to be used at the terminal for receiving the downlink CSI-RS in the measurement reference signal.

11. The user terminal of claim 10, wherein the number of repeated transmissions comprises:
a number of repeated transmissions of a reference signal corresponding to a same port; or a number of repeated transmissions of reference signals having a same transmission mode; or a number of repeated transmissions of reference signals having a same transmission mode in a same reference signal resource block; or a number of repeated transmissions of reference signal resource blocks having a same transmission mode; or a number of repeated transmissions of a reference signal corresponding to a same beam.

12. The user terminal of claim 10, further comprising:
in condition that the reference signal is a measurement reference signal, feeding back, by the terminal, the reference signal parameter for each of P1 types of measurement reference signals, wherein P1 is an integer greater than 1.

13. The user terminal of claim 10, further comprising:
in condition that the reference signal is a measurement reference signal, dividing reference signal resources into P2 groups of reference signal resources, and feeding back, by the terminal, the reference signal parameter for each of the P2 groups of reference signal resources, wherein P2 is an integer greater than 1.

14. The user terminal of claim 10, wherein when the transmission parameter of the reference signal is determined and in condition that a type of the reference signal is a demodulation reference signal, the transmission parameter comprises at least one of:
indication information about a number of repeated transmissions of demodulation reference signals having same precoding;
indication information about a number of symbols for transmitting the demodulation reference signal;
indication information about a time domain density of a resource for transmitting the demodulation reference signal;
indication information about a frequency domain density of the resource for transmitting the demodulation reference signal;
indication information about a position of the demodulation reference signal; or
indication information about a sequence parameter of the demodulation reference signal;
wherein the sequence parameter comprises: a sequence type, indication information about a transmission power of the demodulation reference signal, and indication information about a precoding binding granularity of the demodulation reference signal.

15. The user terminal of claim 10, wherein when the transmission parameter of the reference signal is determined by the terminal and in condition that a type of the reference signal is a phase noise compensation reference signal, the transmission parameter comprises at least one of:
indication information about a time domain density of a resource for transmitting the phase noise compensation reference signal;
indication information about a frequency domain density of the resource for transmitting the phase noise compensation reference signal;

indication information about a position of the phase noise compensation reference signal;
indication information about a sequence parameter of the phase noise compensation reference signal;
indication information about a transmission power of the phase noise compensation reference signal;
indication information about precoding of the phase noise compensation reference signal;
indication information about a number of precoding ports of the phase noise compensation reference signal; or
indication information about a type of the phase noise compensation reference signal.

\* \* \* \* \*